Patented Apr. 3, 1945

2,372,809

UNITED STATES PATENT OFFICE 2,372,809

THIOCYANO ETHER ALCOHOLS

Herman A. Bruson, Philadelphia, Pa., assignor to Röhm & Haas Company, Philadelphia, Pa., a corporation of Delaware No Drawing. Application March 14, 1944, Serial No. 526,483

4 Claims. (Cl. 260—454)

This invention relates to thiocyano ether alcohols having the formula:

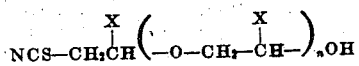

wherein X is hydrogen or methyl and $n$ is a small integer.

These new thiocyano ether alcohols are water-soluble liquids having useful properties as insecticides or larvicides and as intermediates for the preparation of insecticides wherein the terminal hydroxyl is etherified or esterified.

When chloro-alcohols such as ethylene chlorohydrin or propylene chlorohydrin are heated with salts of thiocyanic acid, complex cyclic compounds are obtained (Chemical Abstracts, 32, 2534 (1938)).

In contrast thereto, polyalkylene ether halohydrins of the formula:

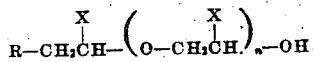

wherein R is halogen and X is hydrogen or methyl and $n$ is an integer from 1 to 3, inclusive, react smoothly with salts of thiocyanic acid to yield the thiocyano ether alcohols of the present invention without the formation of undesirable cyclic bodies.

The reaction can be carried out in water or in an inert solvent, such as acetone, alcohol, toluene, or methyl isobutyl ketone, at temperatures from about 50° to 150° C. Typical salts of thiocyanic acid which can be used are, for example, sodium, potassium, calcium, lead, or ammonium thiocyanates.

The following examples illustrate this invention:

Example 1

A mixture consisting of 186 grams of β-chloroethoxy ethanol,

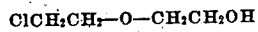

121 grams of pure sodium thiocyanate, and 100 grams of water was stirred and boiled under reflux for three hours. The product was cooled and the salt filtered off by suction. The salt was washed with ethylene dichloride and the washings combined with the filtrate, which was evaporated to dryness under reduced pressure by being heated on a steam bath. The residual oil (230 grams) was filtered from a trace of salt and distilled in vacuo to yield 150 grams of β-thiocyanoethoxyethanol,

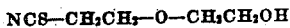

as a colorless oil boiling at 135°–142° C. at 2 mm. Upon redistillation, the compound boiled at 104°–105° C./0.5 mm. and possessed the constants: $n_D^{25}$ 1.4965; $d_4^{25}$ 1.1855.

Example 2

A mixture consisting of equimolecular quantities of potassium thiocyanate and dipropylene glycol chlorhydrin,

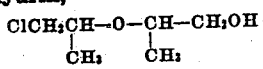

was boiled in the presence of twice its weight of water for five hours under reflux. The product was evaporated to dryness, extracted with acetone, and the acetone extract evaporated to dryness.

The residual oil consisted essentially of β-thiocyanoisopropoxy isopropanol,

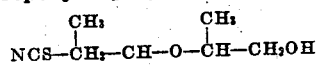

Example 3

A mixture consisting of 100 grams of sodium thiocyanate, 160 grams of triethylene glycol chlorhydrin,

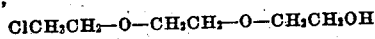

and 200 grams of water was boiled under reflux for five hours. The water was then evaporated off under reduced pressure and the residue extracted with ethylene dichloride. The extract was then evaporated to dryness and the oil filtered free from traces of salt.

The oily product consisted essentially of β-thiocyanoethoxyethoxyethanol,

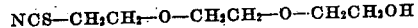

It is readily soluble in water.

In a similar manner, tetraethylene glycol chlorhydrin yields the corresponding

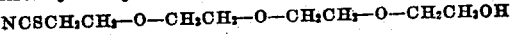

as a colorless oil.

I claim:

1. As a new compound, a thiocyano ether alcohol having the formula:

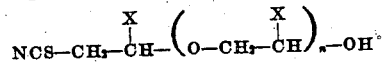

wherein X is a member of the group consisting of hydrogen and methyl and $n$ is a small integer from 1 to 3, inclusive.

2. As a new compound, β-thiocyanoethoxyethanol,

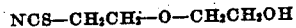

3. As a new compound, β-thiocyanoethoxyethoxyethanol,

4. As a new compound, β-thiocyano-isopropoxyisopropanol.

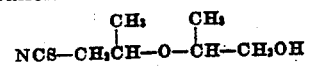

HERMAN A. BRUSON.